United States Patent Office 2,848,156
Patented Aug. 19, 1958

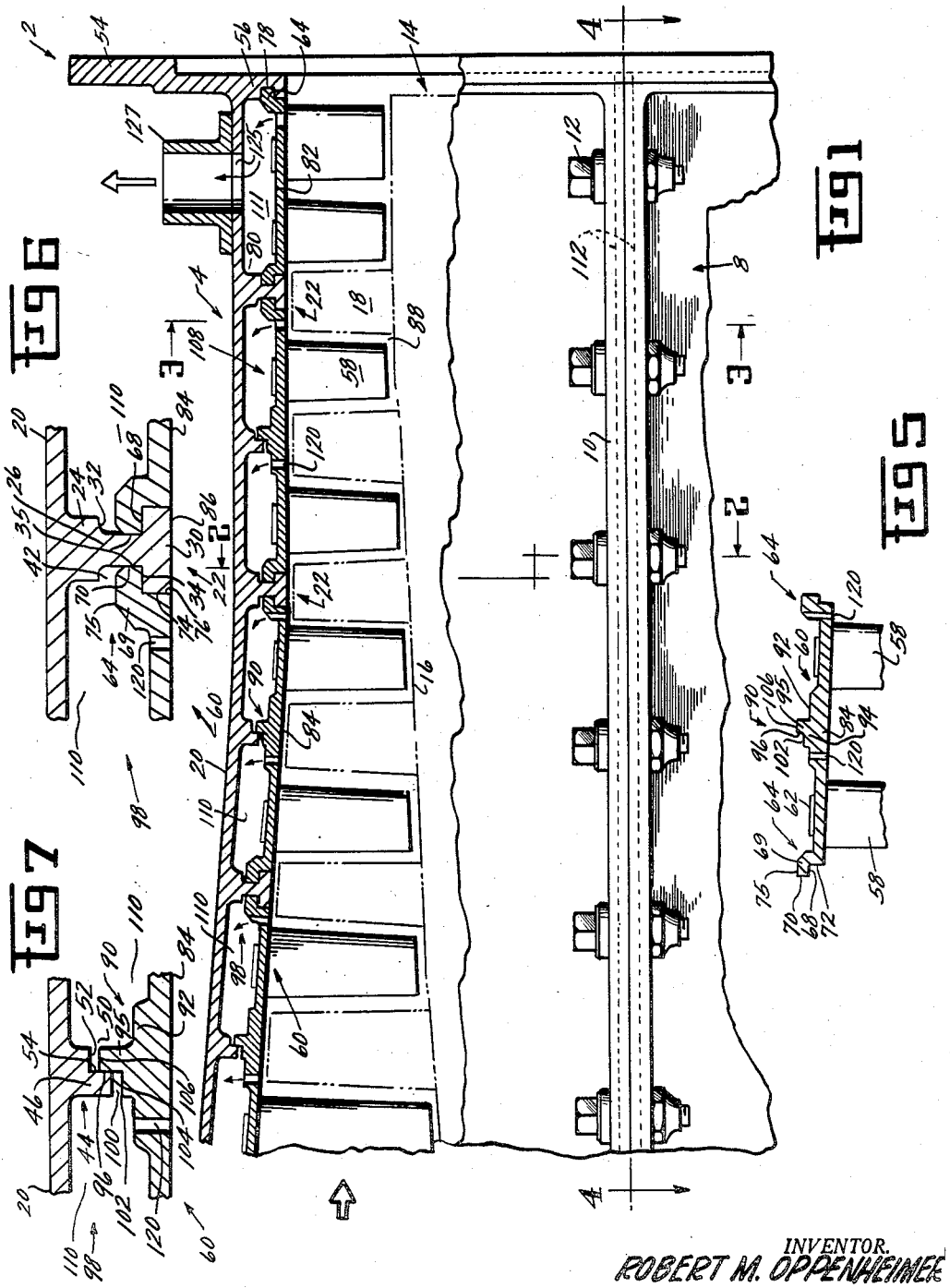

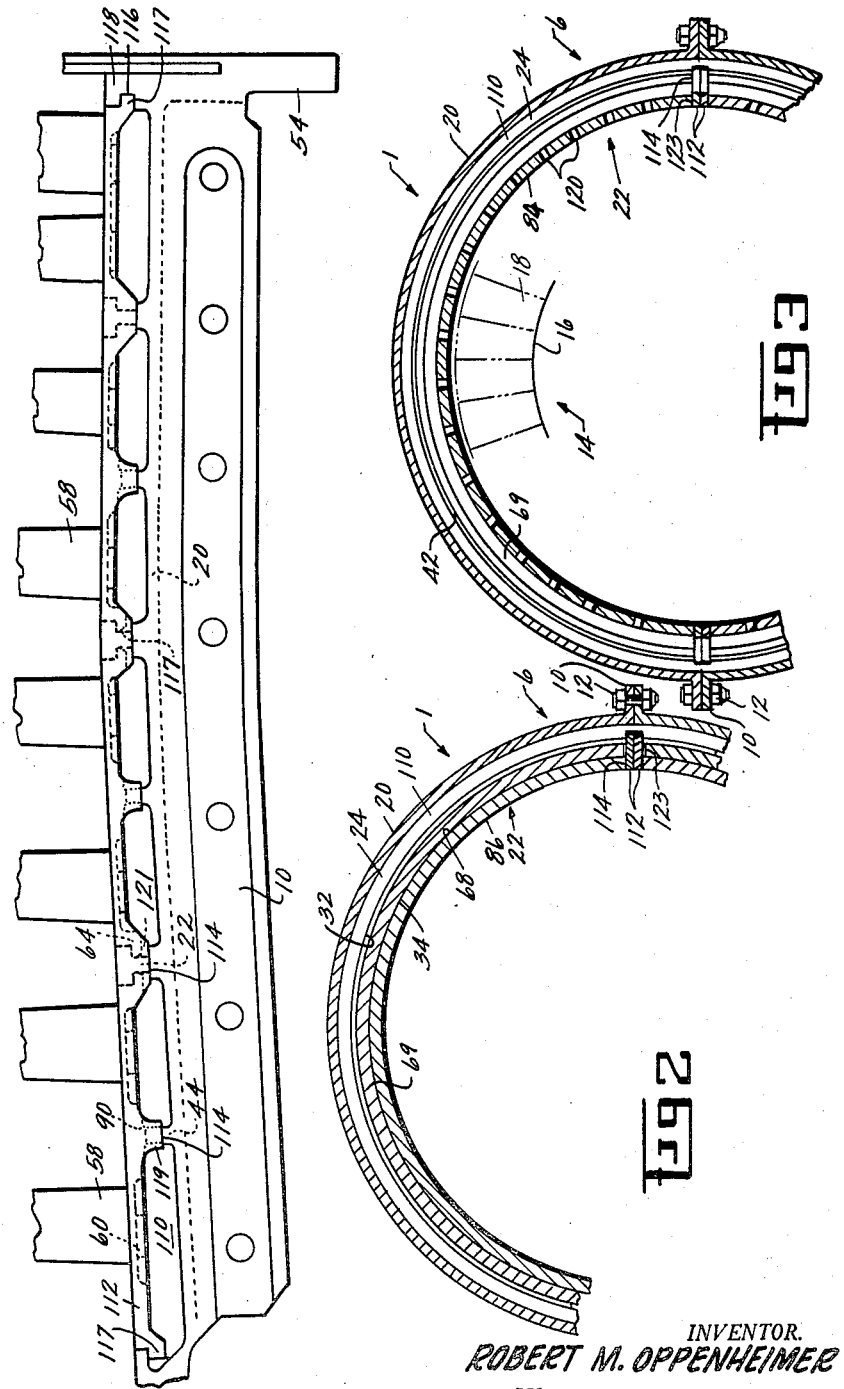

2,848,156

FIXED STATOR VANE ASSEMBLIES

Robert Morris Oppenheimer, Nahant, Mass., assignor to General Electric Company, a corporation of New York Application December 18, 1956, Serial No. 629,075

3 Claims. (Cl. 230—132)

The present invention relates to gas compressors and more particularly to stator vane assemblies in axial flow gas compressors used in gas turbo engines.

It is important that the stator vane tips be accurately spaced from the periphery of the rotor drum so that they are as close thereto as possible without rubbing or adversely interfering with free rotation of the rotor. However, the accuracy with which the vane tips can be radially spaced from the rotor drum is limited by the accuracy with which the vanes can be mounted on the casing. In conventional stator vane assemblies the vanes are mounted on the casing in such a manner that they are rigidly supported against movement in both a radially outward and a radially inward direction by engagement of a radially outwardly facing surface of the vane with a radially inwardly facing supporting surface of the casing and engagement of a radially inwardly facing surface of the vane with a radially outwardly facing supporting surface of the casing. Consequently, the vanes are rigidly held between the radially inwardly facing supporting surface and the radially outwardly supporting surface of the casing in a single, fixed radial operating position. With such an arrangement the accuracy with which the vanes can be mounted on the casing and hence the accuracy with which the vane tips can be radially spaced from the rotor drum depends upon the accuracy with which the radially inwardly and radially outwardly facing surfaces of the casing and the radially inwardly and radially outwardly facing surfaces of the vanes are machined. In order to obtain the required accurate spacing referred to above all four of these surfaces must be accurately machined, which is time consuming and expensive. Furthermore, for relatively small compressors, the accuracy with which these surfaces can be practically machined is limited within certain tolerances so that the accuracy of the spacing and hence compressor efficiency is limited by the stacked up tolerances of all four surfaces.

In accordance with the present invention, a stator assembly is provided in which the member and area of surfaces requiring accurate machining is substantially reduced without adversely affecting the accuracy of the radial spacing of the stator vane tips from the rotor drum periphery and in which the stack up of tolerances affecting the accuracy of such radial spacing is substantially reduced. This is accomplished by rigidly supporting the vanes against movement in only one of a radially inward and a radially outward direction, thereby reducing the number of surfaces which affect the accuracy of the spacing and hence which must be accurately machined from 4 to 2 with a resulting reduction in the stack up of tolerances. Since the stack up of tolerances is reduced the accuracy of the spacing and hence compressor efficiency are substantially increased. Since the number and area of surfaces requiring accurate machining is reduced the stator assembly of the present invention is simple and inexpensive to manufacture and lends itself to mass production techniques. It is another feature of the present invention to yieldably support the vanes against radial movement in the other radial direction so that the vanes are yieldably held in operative position. Preferably this is done by the pressure of a gaseous fluid bled from the interior of the compressor. It is still another feature of the present invention to mount the vanes in rows on one or more circumferentially flexible vane rings the inner surfaces of which form a part of the outer surface of the gas passage through the compressor and which are in turn mounted on the casing in spaced relation with the casing wall in such a manner that the flexible rings and hence the vanes mounted thereon are rigidly supported by the casing against radial movement in one radial direction and are yieldably supported against movement in the other radial direction by the pressure of gaseous fluid bled from the compressor passage into the spaces between the casing wall and rings. The portion of the passage from which the fluid is bled for each space is selected to establish a differential between the average pressure of the fluid in the space and on the ring forming a wall of such space in one radial direction and the average pressure in the passage and on the ring in the opposite radial direction. This pressure differential yieldably holds the ring in operative position against the rigid casing support. Such an arrangement takes advantage of inherent compressor characteristics to yieldably support the rings and vanes. Since the pressure of gaseous fluid forms part of the vane support the thickness of the casing, and the ring when one is used, and consequently the weight of the unit may be substantially reduced which is advantageous in small turbo engines used in aircraft. Repair, overhaul and replacement of parts is substantially reduced because the number of surfaces which are subjected to wear and which, when slightly worn, require repair or replacement are reduced. By sealing off such spaces from each other, the gaseous fluid in each is selectively available for engine air bleed purposes, thereby allowing a wide selection of air bleed pressures any time. The stator vane assembly of the present invention is particularly adapted for use with turbo engines of the type described in application Serial Number 548,987, filed by G. W. Lawson on November 25, 1955, and assigned to the assignee of the present application.

The above and other advantages of the present invention will be apparent from the following description and claims and the accompanying drawings all of which describe by way of illustration only and without limitation what now is considered to be a preferred embodiment of the present invention.

Fig. 1 is a view in elevation and partly in section of a part of a compressor embodying an embodiment of the present invention, Fig. 2 is a section along the line 2—2 of Fig. 1, with the rotor omitted, Fig. 3 is a section along the line 3—3 of Fig. 1 showing only a part of the rotor and with portions of the background omitted, Fig. 4 is a section along the line 4—4 of Fig. 1 with the bolts holding the two halves of the casing together removed, Fig. 5 is an enlarged section similar to Fig. 1 showing only one vane ring, Fig. 6 is an enlarged section similar to Fig. 1 showing in greater detail the manner in which the rings are mounted on the casing, and Fig. 7 is an enlarged section similar to Fig. 1 showing a middle portion of the ring and a corresponding portion of the casing.

Referring to the figures, 2 is a compressor comprising a stator casing 4, having an upper half 6 and a lower half 8 joined by means of flanges 10 and bolts 12 as shown in Fig. 1, and a rotor 14 comprising a rotor drum 16 and rotor blades 18.

Each of the halves of the casing 4 is made up of a relatively thin, semi-cylindrical casing wall 20 having a plurality of spaced, T-shaped rabbets 22 extends radially inwardly thereof and circumferentially therearound. Each T-shaped rabbet comprises a base portion 24 which extends radially inwardly into the narrow stem 26 of the T, which in turn extends into the flange portions 30 forming the web of the T and extending at right angles from the stem 26 in opposite directions. The juncture of 24 and 26 forms a pair of shoulders 32 on either side of the rabbet and the radially outwardly facing surface or shoulder 34 of each flange 30 forms with a side wall 35 of stem 26 and a shoulder 32, a recess 42 so that each rabbet 22 has a pair of recesses 42 in opposite sides thereof.

Also extending radially inwardly and circumferentially around the casing wall 20 and located between adjacent rabbets 22 are a plurality of steadying rims 44 each of which is made up of a thick base portion 46 and a narrow portion 48, a recess 50 being formed by the shoulder 52 and a side wall 54 of portion 48. The aft end of wall 20 extends outwardly into an annular flange 54 and inwardly into an end half rabbet 56. No steadying rim is provided between the half rabbet 56 and its adjacent rabbet 22, but the two rabbets are spaced closer to each other than the other adjacent rabbets 22.

A plurality of stages or rows of stator rings 58 are mounted on a plurality of half rings 60 made of a thin, flexible and resilient steel, two rows of vanes for each ring, by means of shanks 62 fixed in apertures in the ring by brazing, and the rings are in turn mounted on the casing halves in spaced relationship with casing wall 20 by means of a pair of offset, semi-annular rabbet portions 64 which are located at opposite sides of the ring 60 and which are received in oppositely facing recesses 42 of adjacent rabebts 22, as shown, with the radially inwardly facing surfaces 68 of the portions 69 thereof engaging and rigidly supported by the radially outwardly facing surfaces 34 of the adjacent rabbets 22 and the edges 70 of portions 69 snugly engaging the oppositely facing walls 35 of the adjacent rabbets 22. The flanges 30 of the adjacent rabbets 22 are snugly received in the recesses 72 formed by the surfaces 68 and 74 of rabbets 64 with the surfaces 74 snugly engaging the edges 76 of the flanges. All of the casing rabbet recesses 42 except the recess 78 in the half rabbet 56 and the opposing recess 80 in the adjacent rabbet 22 are radially wider than the thickness of portion 69 so that the surfaces 75 of portions 69 are spaced from the shoulders 32 of the recesses 42. However, the radial width of recesses 78 and 80 are such that the ring 82 and hence the last two stages of vanes mounted thereon are rigidly supported against both radial movement inwardly and radial movement outwardly. Rotor blades 18 extend between adjacent rows of vanes except for the last two stages of vanes which are located relatively close to each other as shown. When the rings 60 are in the position shown, which is the position they normally occupy during compressor operation and in which the surfaces 68 engage surfaces 34, the radially inwardly facing surfaces 84 of the rings 60 are flush with the radially inwardly facing surfaces 86 of rabbets 22 and they together form the outer wall of the fluid passage 88 of the compressor through which the gaseous fluid passes. A portion of each ring 60 extends fore and aft of each row of blades mounted thereon. Extending radially outwardly from the mid portion of each ring 60 between the two rows of vanes mounted thereon is a steadying rim 90 made up of a thickened base portion 92 which extends into a narrower portion 94 which in turn extends radially outwardly into a still narrower annular rim portion 95, one surface 96 of which snugly engages the surface 54 of the casing rim 48, as shown. Portions 94 and 95 form a semi-annular recess 100 in which rim portion 48 is received, the rim portion 95 being received in the semi-annular recess 50 of rim 44. When surfaces 68 of the ring rabbets are in engagement with the surfaces 34 of the casing rabbets, as shown, the shoulder 102 of recess 100 is spaced from the edge 104 of the rim portion 48 and the edge 106 of the rim portion 95 is spaced from the shoulder 52 to permit outward radial movement of ring 60. Each rim 44 and its associated rim 90 divide the space 108 between each ring 60, the casing wall 20, and adjacent rabbets 22 into two parts 110, one for each row of vanes. Each semi-annular space 110 is defined by the inner surface of casing wall 20, a part of the outer surface of a ring 60, a rabbet 22 and the wall formed by the rim 90 of the ring and its associated rim 44 of the casing. Ring 82 does not have any rim 90 and has only one annular space 111 located radially outwardly therefrom for both stages of vanes attached thereto. Space 111 is bounded by the outer surface of ring 82, rabbet 56, its adjacent rabbet 22 and the inner surface of casing wall 20.

The half rings 60 and 82 mounted in each half of the casing are locked in the recesses 42, 78 and 80 respectively, by means of two locking plates 112 located in recesses 114 in the ends of the casing rabbets 22 and 56. One end 117 of one of the plates is received in a recess 116 in the flat surface 118 of end flange 54 where it comes together with the end flange 54 of the other half of the casing. The plates have widened portions 119 and 121 overlying the ends 123 of the rabbets 64 and rims 90 and prevent the rings from sliding circumferentially around the casing. The two plates for the top half of the casing abut against the two plates of the bottom half of the casing. During compressor operation when the surfaces 68 of the ring rabbets engage the surfaces 34 of the casing rabbets, the fit between the ends 123 of the rings and locking plates, the fit between abutting locking plates and the fit between the locking plates and the wall of the recesses 114 are snug so as to provide a sealing effect between the spaces 110 and the interior of the casing. The abutting surfaces of the locking plates 112 are flush with the abutting surfaces of the flanges 10 and of the non-recessed portions of the ends of the casing wall 20, casing rabbets 22 and casing rims 44.

Each ring 60 has a row of holes 120 located aft of each row of blades attached thereto and spaced circumferentially therearound. Each set of holes provides communication between the gaseous fluid in the compressor passage 88 and the space 110 located radially outwardly of the row of blades immediately forward of the set of holes. The holes for each space 110 are located aft of the center of the space. The further aft they are the better so long as they are in the portion of the ring forming a wall of the space. The snug fit between the walls 70 and 35 and the walls 74 and 76 of the rabbets 22 and 64 and the snug fit between the edges 54 and 96 of the rims 44 and 90 provide an effective seal between each space 110 and the passage 88 and between adjacent spaces at all times regardless of the radial position of rings 60 and their rabbets 64 with respect to the casing. Consequently the spaces 110 are substantially sealed off from the gaseous fluid in passage 88 except for the flow of fluid through the apertures 120. They are also substantially sealed off from each other.

Each flexible half ring 60 and 82 is assembled in the halves of the casing by inserting one end of the half ring with the vanes attached thereto into one end of a space 110, with the rabbets 64 of the ring being inserted into the oppositely facing recesses 42 of adjacent rabebts 22, and sliding the ring circumferentially around the recess into place. After all the rings have been inserted in both halves, locking members 112 are placed in the recesses 114 and 116 whereafter the two halves of the casing are bolted together. Each space 110 of each half of the casing communicates and is aligned with the corresponding space 110 of the other half. The half rings 60, semi-annular rabbets 22 and semi-annular rims 44 of each half of the casing are aligned with their corresponding half rings, semi-annular rabbets and semi-annular rings of the other half of the casing to form annular rings, annular rabbets and annular rims.

During compressor operation, air under pressure passes from the fluid passage 88 through the holes 120 into the spaces 110. Since the set of holes for each annular space 110 is located in the aft part of the portion of the ring forming a wall of the space and since the pressure in passage 88 increases in the aft direction and the space is substantially sealed from passage 88 forward of the holes 120, the average pressure of the fluid in the space exerted on the ring in a radially inward direction is greater than the average pressure of the fluid in passage 88 exerted on the ring in a direction radially outward. This pressure differential yieldably urges the flexible ring 60 radially inwardly and the surfaces 68 of the rabbets 64 into engagement with the rigid faces 34 of the rabbets 22, whereby the rings 60 are forced to conform with the casing rabbet diameters or surfaces 34 and the vanes are yieldably held in operative position with the vane tips thereof located very close to the periphery of the rotor 16. A limited amount of leakage between passage 88 and each space 110 forward of its holes 120 is permissible so long as it is insufficient to eliminate the pressure differential referred to above. Consequently, statements herein to the effect that the spaces are substantially sealed from communication with passage 88 forward of or except through holes 120 and that the ring and casing rabbets form a seal between the passage and spaces are intended to include arrangements in which the leakage between each space and the passage forward of the holes 120 for that space and leakage between the ring and casing rabbets of that space forward of the holes are insufficient to destroy this pressure differential.

Thus, the rings and vanes are supported rigidly against movement in only one radial direction, that is, radially inwardly, by the surfaces 34 and are yieldably supported against movement in the other radial direction by the pressure of the fluid in the spaces 110. Ring 82 is rigidly supported against movement in both radially outward and radially inward direction.

The accuracy of the surfaces 75 and 32 do not affect the accuracy of the spacing of the vane tips from the rotor drum. Consequently they do not have to be accurately machined and the tolerances thereof do not reduce the accuracy of such spacing and hence the efficiency of the compressor. Furthermore, since the rings and vanes are yieldably rather than rigidly supported against movement in a radially outward direction no substantial harm will result even if the tips of the vanes are too close to the rotor because the vanes and rings are free to move radially outwardly against the force of the fluid pressure in the spaces 110 by contact between the vane tips and rotor. Consequently, the surfaces 68 and 34 do not have to be machined as accurately as they would if the vanes were supported rigidly in both a radially inward and a radially outward direction. Furthermore, if the surfaces 34 and 68 become slightly worn, in view of repeated assembly and disassembly, the compressor need not be overhauled because, as set forth above, these surfaces can be inaccurate without any substantial harm being done. Because of this and because the surfaces 75 and 32 are not subject to wear requiring overhaul, the arrangement of the present invention increases the life of the compressor and reduces maintenance. Furthermore, the play between the rabbets of the ring and casing make the casing easy and inexpensive to assemble and disassemble.

By providing an aperture 125 in the casing wall 20 forming a wall of any one or all of the spaces 110 and connecting therewith a duct 127 leading to various parts of the engine, the air in the spaces is made available for engine air bleeds in any location desired on the casing. This allows a large selection of air bleed pressures and temperatures at any time.

The spaces 110 form a common plenum chamber to give a source of uniform bleed from around the periphery or circumference of any one stage. This improves the performance of the engine.

When it is stated herein that the vanes are supported rigidly in only one radial direction the term "radial direction" is intended to mean a radially outward and a radially inward direction and is not intended to refer to the direction in which any radius extends with respect to another radius.

While a particular embodiment of the invention has been illustrated and described, it will be obvious to those skilled in the art that various changes and modifications may be made without departing from the invention, and it is intended to cover in the appended claims all such changes and modifications that come within the true spirit and scope of the invention.

What I claim as new and desire to secure by Letters Patent of the United States is:

1. A compressor stator assembly comprising a stator casing, a pair of longitudinally spaced vane supporting rabbets extending radially inwardly from said casing, each of said vane supporting rabbets having a radially outwardly facing rabbet surface thereon, a vane ring extending betwene said vane supporting rabbets, at least a portion of said vane ring being spaced radially inwardly from said casing to form a space between said vane ring portion and said casing, a plurality of vanes mounted on said vane ring and extending radially inwardly therefrom, said vane ring having radially inwardly facing rabbet surfaces thereon engaging the radially outwardly facing rabbet surfaces on said vane supporting rabbets to locate and limit the movement of said vane ring in the radially inward direction, said vane ring being free to move relative to said casing in a radially outward direction, and fluid conduit means connecting the space between said vane ring portion and said casing in fluid communication with the main fluid passage of the compressor, the connection to the compressor main fluid passage being made at a point such that the total force exerted radially inwardly on said vane ring by the pressure of the fluid in the space between said vane ring portion and said casing when the compressor is operating is greater than radially outward force exerted on said vane ring by the fluid flowing in the compressor main fluid passage, whereby said vane ring is yieldably urged radially inwardly against the outwardly facing rabbet surfaces on said vane supporting rabbets.

2. A compressor stator assembly comprising a stator casing, a pair of longitudinally spaced vane supporting rabbets extending radially inwardly from said casing, each of said vane supporting rabbets having a radially outwardly facing rabbet surface thereon, a vane ring extending between said vane supporting rabbets, at least a portion of said vane ring being spaced radially inwardly from said casing to form a space between said vane ring portion and said casing, a plurality of vanes mounted on said vane ring and extending radially inwardly therefrom, said vane ring having radially inwardly facing rabbet surfaces thereon engaging the radially outwardly facing rabbet surfaces on said vane supporting rabbets to locate and limit the movement of said vane ring in the radially inward direction, said vane ring being free to move relative to said casing in a radially outward direction, and at least one aperture extending through said vane ring and connecting the space between said vane ring portion and said casing with the main fluid passage of the compressor, said aperture being located in the longitudinal direction at a point such that the total force exerted radially inwardly on said vane ring by the pressure of the fluid in the space between said vane ring portion and said casing when the compressor is operating is greater than the radially outward force exerted on said vane ring by the fluid flowing in the compressor main fluid passage, whereby said vane ring is yieldably urged radially inwardly against the outwardly facing rabbet surfaces on said vane supporting rabbets.

3. A compressor stator as set forth in claim 2 wherein radially extending surfaces are provided on said vane supporting rabbets and on said vane ring, the radially extending surfaces on said vane supporting rabbets being in face to face engagement with the radially extending surfaces on said vane ring to substantially seal off fluid leakage across said surfaces independently of the radial position of said vane ring.

References Cited in the file of this patent

UNITED STATES PATENTS

| | | |
|---|---|---|
| 2,488,867 | Judson | Nov. 22, 1949 |
| 2,543,355 | Davis et al. | Feb. 27, 1951 |
| 2,610,786 | Howard | Sept. 16, 1952 |
| 2,698,711 | Newcomb | Jan. 4, 1955 |
| 2,722,373 | Ledwith et al. | Nov. 1, 1955 |

FOREIGN PATENTS

| | | |
|---|---|---|
| 622,895 | Great Britain | May 9, 1949 |

UNITED STATES PATENT OFFICE
CERTIFICATE OF CORRECTION

Patent No. 2,848,156            August 19, 1958

Robert Morris Oppenheimer

It is hereby certified that error appears in the printed specification of the above numbered patent requiring correction and that the said Letters Patent should read as corrected below.

Column 1, line 53, for "member" read --number--.

Signed and sealed this 14th day of October 1958.

(SEAL)
Attest:

KARL H. AXLINE
Attesting Officer

ROBERT C. WATSON
Commissioner of Patents